(12) United States Patent
Filonov et al.

(10) Patent No.: US 10,963,766 B2
(45) Date of Patent: Mar. 30, 2021

(54) METHOD AND SYSTEM FOR CONTROLLING RADIATION SCATTERING

(71) Applicant: Ramot at Tel-Aviv University Ltd., Tel-Aviv (IL)

(72) Inventors: Dmitri Filonov, Tel-Aviv (IL); Vitali Kozlov, Tel-Aviv (IL); Amir Boag, Tel-Aviv (IL); Pavel Ginzburg, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 21 days.

(21) Appl. No.: 16/480,683

(22) PCT Filed: Dec. 18, 2018

(86) PCT No.: PCT/IL2018/051373
§ 371 (c)(1),
(2) Date: Jul. 25, 2019

(87) PCT Pub. No.: WO2019/123459
PCT Pub. Date: Jun. 27, 2019

(65) Prior Publication Data
US 2019/0392275 A1 Dec. 26, 2019

(30) Foreign Application Priority Data
Dec. 19, 2017 (IL) .......................................... 256411

(51) Int. Cl.
*G06K 19/00* (2006.01)
*G06K 19/07* (2006.01)
(Continued)

(52) U.S. Cl.
CPC ............ *G06K 19/0723* (2013.01); *G01S 7/38* (2013.01); *H04B 1/713* (2013.01); *H04B 5/0062* (2013.01); *H04W 4/80* (2018.02)

(58) Field of Classification Search
CPC ....... G06K 19/0723; H04W 4/80; G01S 7/38; H04B 1/713; H04B 5/0062
See application file for complete search history.

(56) References Cited

U.S. PATENT DOCUMENTS 6,777,684 B1 * 8/2004 Volkov ............... G01N 21/3581
250/341.1
8,944,330 B2 2/2015 Wang et al.
(Continued)

FOREIGN PATENT DOCUMENTS

| JP | 2013-005044 | 1/2013 |
|---|---|---|
| WO | WO 2019/123459 | 6/2019 |

OTHER PUBLICATIONS

International Search Report and the Written Opinion dated Apr. 16, 2019 From the International Searching Authority Re. Application No. PCT/IL2018/051373. (12 Pages).

*Primary Examiner* — Curtis B Odom (57) ABSTRACT

A method for controlling radiation scattering, comprises: directing radiation to a metamaterial having an array of individually tunable and near field coupled resonators, varying an individual resonance frequency of at least one of the resonators to provide a collective resonance scattering of the radiation by the metamaterial, measuring a scattering signal of the collective resonance scattering of the radiation, and identifying the metamaterial based on the scattering signal.

20 Claims, 8 Drawing Sheets

(51) Int. Cl.
*H04W 4/80* (2018.01)
*G01S 7/38* (2006.01)
*H04B 5/00* (2006.01)
*H04B 1/713* (2011.01)

(56) References Cited

U.S. PATENT DOCUMENTS

| | | |
|---|---|---|
| 10,185,911 B1 | 1/2019 | Feng et al. |
| 2008/0252293 A1* | 10/2008 | Lagae ................. G01S 13/0209 324/318 |
| 2013/0240251 A1 | 9/2013 | Kaplan et al. |
| 2016/0013531 A1 | 1/2016 | Casse et al. |
| 2016/0261042 A1 | 9/2016 | Sazegar et al. |

* cited by examiner

METHOD AND SYSTEM FOR CONTROLLING RADIATION SCATTERING

RELATED APPLICATIONS

This application is a National Phase of PCT Patent Application No. PCT/IL2018/051373 having International filing date of Dec. 18, 2018, which claims the benefit of priority of Israeli Patent Application No. 256411 filed on Dec. 19, 2017. The contents of the above applications are all incorporated by reference as if fully set forth herein in their entirety.

FIELD AND BACKGROUND OF THE INVENTION

The present invention, in some embodiments thereof, relates to radiation scattering and, more particularly, but not exclusively, to a method and system for controlling radiation scattering.

The verification of the authenticity of an item is often done by labelling the item with a distinguishable piece of identification. Traditionally, such identification is the label bearing the maker's name and product name, but the ability to reproduce such labels by counterfeiters has required more sophisticated solutions. Identification techniques currently used include engraving, holograms, two dimensional bar codes, referred to as QR codes, and integrated circuits commonly referred to as identification (ID) tags.

With the developed wireless technologies, diverse ID tag reading systems ranging from a prepayment bus card to a parking lot pass and a laboratory pass are used. The ID tag reading system includes a tag and a reader. The ID tag reading system operates in the method that the tag modulates the reflected radiation once the reader sends it. For example, in devices known as RFID tag systems, the tag data are transmitted as radiofrequency (RF) radiation. The reader can be formed in various terminals including smartphones and specially designed circuits. The tag can be implemented in the form of a card which a user can carry such as a pass and a bus card, or can be implemented in the form of a sticker which is attached to a product to transmit product information. Different types of tags for marking boxes, containers and other goods can be used in logistic applications, where management of storage is required.

Some ID tags include a battery embedded in the tag for supplying power for its operation. Other ID tags are of the passive type which generates an induced current using radiation transmitted from the reader. Passive tags in the form of a slim and light-weight card are generally used. As the passive tag does not need a battery, it can be miniaturized and low-priced. Tags with batteries can be subdivided into two categories (i) active tags that generate the radiation, and (ii) battery assisted tags that use the battery to power the electronic circuit only and not to generate the radiation. Battery assisted tags require substantially less energy from the battery compared to active tags.

SUMMARY OF THE INVENTION

According to some embodiments of the invention the present invention there is provided a method of controlling radiation scattering. The method comprises directing radiation to a metamaterial having an array of individually tunable and near field coupled resonators, varying an individual resonance frequency of at least one of the resonators to provide a collective resonance scattering of the radiation by the metamaterial, measuring a scattering signal of the collective resonance scattering of the radiation, and identifying the metamaterial based on the scattering signal.

According to some embodiments of the invention there is a plurality of spaced apart metamaterials, and the method comprises simultaneously measuring signals scattered off at least two of the metamaterials.

According to an aspect of some embodiments of the present invention there is provided a method of transmitting information. The method comprises: encoding data in a radiation, directing the radiation to a metamaterial having an array of individually tunable and near field coupled resonators, varying an individual resonance frequency of at least one of the resonators to provide a collective resonance scattering of the radiation, and transmitting the scattered radiation over a communication network.

According to some embodiments of the invention the radiation is directed by a radiation source at a distance of at least 10 meters from the metamaterial.

According to an aspect of some embodiments of the present invention there is provided a method of jamming a radar system. The method comprises: directing radiation received from the radar system to a metamaterial having an array of individually tunable and near field coupled resonators, and varying an individual resonance frequency of at least one of the resonators to provide a collective resonance scattering of the radiation mimicking a Doppler shift to be detected by the radar system.

According to an aspect of some embodiments of the present invention there is provided a method of jamming a radar system. The method comprises: directing radiation received from the radar system to a metamaterial having an array of individually tunable and near field coupled resonators, each being individually controlled by a circuit, and varying a response time of at least one of the resonators to provide a collective resonance scattering of the radiation at a delayed time thereby jamming the radar system.

According to some embodiments of the invention the metamaterial is a metasurface.

According to some embodiments of the invention the metamaterial is configured such that a collective resonance frequency is variable over a range of at least 100 MHz by varying the individual resonance frequency of at least one of the resonators.

According to some embodiments of the invention the variation is executed dynamically to provide frequency hopping.

According to some embodiments of the invention the variation is by individually applying voltage to the at least one of the resonators.

According to some embodiments of the invention the variation is by individually applying mechanical stress to the at least one of the resonators.

According to some embodiments of the invention the variation is by applying heat to the at least one of the resonators.

According to some embodiments of the invention the variation is by varying a humidity in an environment containing the at least one of the resonators.

According to some embodiments of the invention the variation comprises directing additional radiation to the metamaterial.

According to some embodiments of the invention the variation comprises varying a capacitance of the at least one resonator.

According to some embodiments of the invention the variation comprises varying an inductance of the at least one resonator.

According to some embodiments of the invention each resonator comprises a varactor diode and wherein the varying comprises applying a reverse voltage to the varactor diode.

According to some embodiments of the invention each resonator comprises a transistor, and wherein the varying comprises applying a gate voltage to the transistor.

According to some embodiments of the invention each resonator is characterized by a nonlinear response.

According to some embodiments of the invention the method comprises modulating the radiation by at least one on of the resonators to encode information therein.

According to some embodiments of the invention the modulation comprises amplitude modulation.

According to some embodiments of the invention the modulation comprises frequency modulation.

According to some embodiments of the invention the modulation comprises phase modulation.

According to an aspect of some embodiments of the present invention there is provided a kit for identification of a plurality of objects. The kit comprises a plurality of identification (ID) tags, each being mountable on one of the objects and comprises a metamaterial having an array of near field coupled resonators each being coupled to a controllable circuit configured to provide a collective resonance scattering of radiation, wherein any two ID tags of the plurality of ID tags are characterized by two different collective resonance frequencies, and wherein for at least two of the ID tags, a difference in respective collective resonance frequencies is at least 100 MHz.

According to some embodiments of the invention the collective resonance is a permeability resonance.

According to some embodiments of the invention the collective resonance is a permittivity resonance.

According to some embodiments of the invention the collective resonance is a permittivity resonance and a permeability resonance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to radiation scattering and, more particularly, but not exclusively, to a method and system for controlling radiation scattering.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
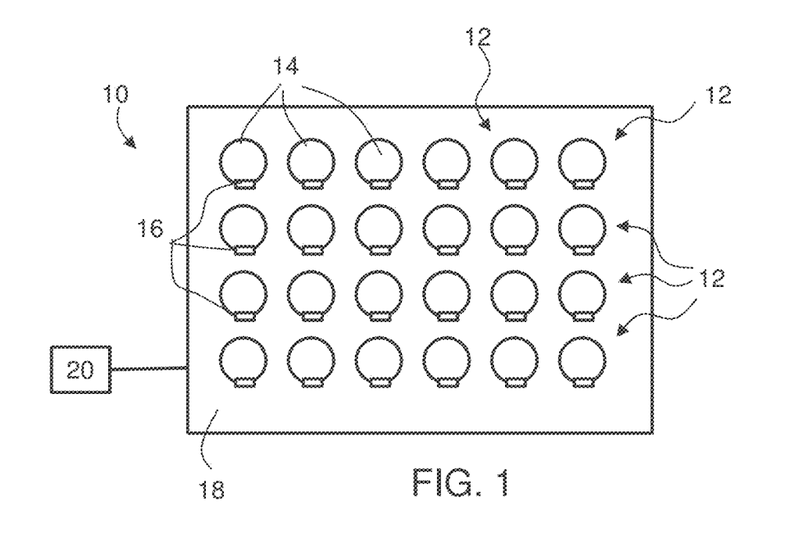
FIG. 1 is a schematic illustration of a metamaterial suitable for preferred embodiments of the present invention.

Referring now to the drawings, FIG. 1 is a schematic illustration of a metamaterial 10 suitable for preferred embodiments of the present invention. Metamaterial 10 is a synthetic cellular structure based on resonators that act to scatter radiation interacting therewith. The radiation can be electromagnetic radiation. Preferably, but not necessarily, the scattered radiation is at a frequency of from about 1 kHz to about 100 GHz. Each of the resonators is optionally and preferably characterized by a nonlinear and/or parametric response. The response value can be set by selecting an external trigger and/or the intensity of the radiation.

As used herein, "cellular" is used to indicate that the structure defines a network of generally repeating and inter-coupled cells 12 each comprising a resonator 14. The coupling between the resonators 14 is preferably near field coupling.

As used herein "near field coupling" refers to interaction by exchanging a non-radiative physical field (e.g., electric field, magnetic field, electromagnetic field).

Each of resonators 14 is preferably near field coupled at least to each of its nearest neighbor resonators, but may optionally and preferably also be near field coupled to each of its next to nearest neighbor resonators, or each of its next to next to nearest neighbor resonators etc. The distance between two nearest neighbor resonators is preferably less than a smallest wavelength of the radiation that metamaterial 10 is designed to scatter.

The resonators 14 can be arranged two-dimensionally on a carrier substrate 18, in which case metamaterial 10 is referred to as a metasurface. Alternatively, resonators 14 can be arranged three-dimensionally, e.g., in layers wherein each layer comprises a carrier substrate such as substrate 18 with two-dimensional arrangement of the resonators thereon. Preferably, the resonators 14 are arranged isotropically, but anisotropic arrangements are also contemplated. In various exemplary embodiments of the invention, each of cells 12 comprises a circuit 16 that modulates the characteristic resonance frequency of the respective resonator 14. Circuit 16 an electrical resonant circuit such as, but not limited to, as an inductor-capacitor circuit or any equivalent circuit. For example, circuit 16 can be, or comprise, a varactor diode, a transistor (e.g., a field effect transistor), a memory element, a compound electronic circuit with a function or the like.

The circuits 16 of metamaterial 10 are preferably configured such that several of the resonators, e.g., at least 40% or at least 60% or at least 80% or more preferably all the resonators, resonate collectively by virtue of the near field coupling thereamongst.

As used herein "collective resonance" refers to a delocalized resonant oscillation of at least one physical field (e.g., electric field, magnetic field, electromagnetic field). The resonant oscillation is "delocalized" in the science that it occurs over a region (an area or a volumetric region) that contains a plurality of cells.

The collective resonance provides metamaterial 10 with a macroscopic property that is frequency dependent. For example, the collective resonance can result in a frequency dependent magnetic permeability $\mu(\omega)$ and/or frequency dependent magnetic permittivity $\varepsilon(\omega)$.

In some embodiments of the present invention the collective resonance frequency is variable over a range of at least 1 kHz or at least 10 kHz or at least 100 kHz or at least 1 MHz or at least 10 MHz or at least 100 MHz or at least 200 MHz or at least 300 MHz or at least 400 MHz or at least 500 MHz or at least 600 MHz or at least 700 MHz or at least 800 MHz or at least 900 MHz, e.g., about 1 GHz or more, by operating one or more of the circuits 16 to vary the individual resonance frequency of the respective resonator(s). The broadband operation can be ensured by selecting the shape of the resonators and/or the circuits, which can be electronically and/or optically and/or mechanically tunable or with any external trigger.

Each of resonators 14 can comprise any structure that is capable of inducing local resonance scattering of radiation interacting therewith. Representative examples including, without limitation, a conducting split ring, a conducting nested split ring, a conducting sphere, a spiral loop, a split ring having more than two gaps, an omega shaped element, a pair of cut wires, electrical LC elements, and the like.

In various exemplary embodiments of the invention circuits 16 are configured to allow dynamical variation of the resonance frequency of the respective resonator. The variation of the resonance frequency can be by accomplished by varying any of the capacitance, inductance, conductance and/or resistance of the respective circuit or component thereof. For example, when circuit 16 comprises a varactor diode, the frequency can be varied by applying a reverse voltage to the varactor diode, and when the circuit comprises a transistor, the frequency can be varied by applying a gate voltage to the transistor. Also contemplated are circuits containing photodiodes. These embodiments are advantageous from the standpoint of reducing the number of electric wires, since the photodiodes can be controlled by optical signals.

Circuits 16 can be powered using a power source 20. Alternatively, metamaterial 10 can be a passive device in which case the power to circuits 16 is supplied by radiation interacting therewith. The radiation can be the radiation scattered by resonators 14 or additional radiation, preferably of the same type but different frequency compared to the scattered radiation. For example, both the scattered radiation and the additional radiation can be of the electromagnetic type, except that the frequency range of the scattered radiation is in the radiofrequency range, and the frequency range of the additional radiation is at an optical range of frequencies (e.g., infrared, visible, ultraviolet). Also contemplated is the use of ambient radiation of any frequency such as, but not limited to, radiofrequency, GHz frequency e.g., wifi) and optical frequency for powering the electronic circuit. Thus, the metamaterial of the present embodiments can optionally and preferably harvest energy for its operation from radiation that already exists without the need to apply radiation for powering the metamaterial and without the need to wired the metamaterial to a power source.

Metamaterial 10 can be used in many applications. Some of the contemplated applications will now be described with reference to FIGS. 2A-C.

In some embodiments of the present invention metamaterial 10 is incorporated in an identification tag 22 (FIG. 2A), such as, but not limited to, an RFID tag, and can therefore be used for identification. The advantage of using metamaterial 10 in an identification tag is that it exhibits relatively high scattering cross sections, with a resonant position that is tunable over a large bandwidth. This allows manufacturing a large number of identification tags 22 that can be distinguished from each other, and which can therefore be used to identify a large number of objects (not shown), each carrying one of these tags. The identification tags can be manufactured with a different and distinguishable resonance spectrum for each tag, or, more preferably, they can be manufactured as identical tags and then be tuned each to a different resonance spectrum by powering circuits 16. In use, an identification tag reader 24 transmits radiation 26 (e.g., RF radiation) to tag 22. The metamaterial 10 scatters the radiation 26 in a collective resonant manner, as further detailed hereinabove, to provide scattered radiation 28. Identification tag reader 24 receives radiation 28, and analyzes the received radiation to extract its spectral content. Since tag 22 has a distinguishable resonance spectrum, identification tag reader 24 can identify tag 22 based on the extracted spectral content.

Figure 2A:
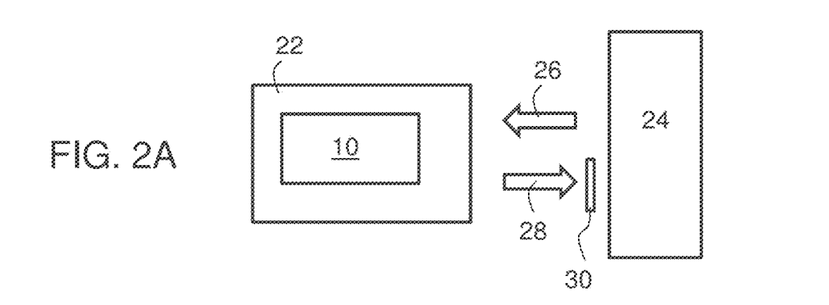
FIGS. 2A-C are schematic illustrations showing several applications for a metamaterial according to some embodiments of the present invention.

An additional level of detectability of identification tag 22 according to some embodiments of the present invention can optionally and preferably be achieved with time modulation of the scattering cross section, for example, by applying to circuits 16 of metamaterial 10 voltage that varies with the time. This is particularly useful in a cluttered environment. Since the scattering off metamaterial 10 that is incorporated in tag 22 is modulated in time, the scattered radiation 28 acquires a frequency shift which can be easily detected and distinguished over the cluttered environment, for example, by introducing a filtered 30 at the path along which radiation 28 propagate.

Figure 2B:
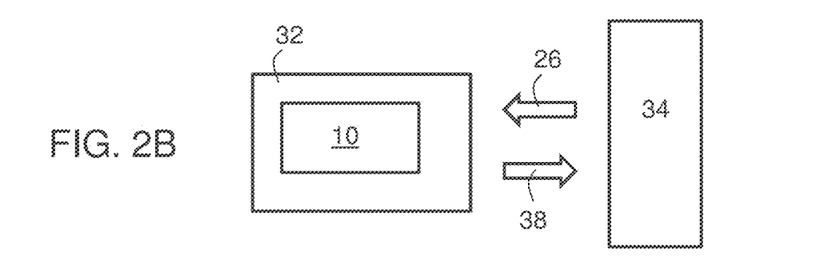

In some embodiments of the present invention one or more metamaterials (such as, but not limited to, metamaterial 10) is incorporated in an electronic warfare system 32. In these embodiments, radiation 26 that is received from a radar system 34 is directed to the metamaterial 10, and circuits 16 are optionally and preferably operated to generate a frequency shift that mimics a Doppler shift. The frequency shifted scattered radiation 38 is directed back to the radar system 34. The radar system 34 identifies the frequency shift as a Doppler shift, determines that the vector carrying the metamaterial (vehicle, human, animal, not shown) is at motion, and calculates the motion characteristic that is associated with the Doppler shift. Since the Doppler shift that is acquired by the radar system 34 is, at least in part, the result of operating circuits 16 and not the result of motion, the metamaterial of the present embodiments successfully jams the radar system 34. Alternatively or additionally, circuits 16 can optionally and preferably be operated to vary the response time of the resonators to radiation 26 so that the collective resonance scattering, hence also scattered radiation 38, is delayed. The delayer radiation 38 is then directed to radar system 34. Radar system 34 determines the range to a target based on a time of flight calculation. Since radiation 38 is delayed, the time of flight, as perceived by radar system 34 is lengthened, and so an incorrect range to the target carrying the metamaterial is determined by radar system 34.

Figure 2C:
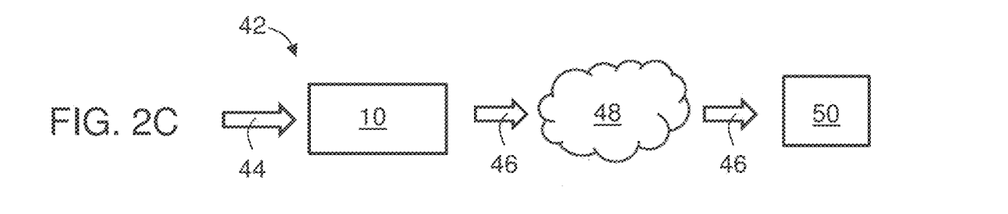

In some embodiments of the present invention one or more metamaterials (such as, but not limited to, metamaterial 10) is incorporated in a communication system 42. In these embodiments, radiation 44 that encodes data is directed to metamaterial 10 that scatters the radiation in a collective resonant manner to provide scattered radiation 46 which also encodes the data. The scattered radiation 46 is then transmitted by the communication system over a communication network 48. In various exemplary embodiments of the invention the circuits 16 of metamaterial 10 of communication system 42 are operated to dynamically switch between several resonance frequencies, for example, according to a predetermined frequency hopping protocol. Such switching can provide an additional level of security to the encoded data. At a receiving communication system 50, the same frequency hopping protocol is used to decode the information from radiation 46 as known in the art. The frequency hopping protocol can be provided only to authorized receiving communication system 50, so that the information in radiation 46 cannot be decoded by an unauthorized system intercepting the transmission.

Some embodiments provide a kit for identification of a plurality of objects. The kit can comprise a plurality of identification tags, such as, but not limited to tag 22. Each of the tags is mountable on one of the objects. According to some embodiments of the present invention any two identification tags of the kit are characterized by two different collective resonance frequencies, and for at least two of the identification tags, a difference in the respective collective resonance frequencies is at least 1 kHz or at least 10 kHz or at least 100 kHz or at least 1 MHz or at least 10 MHz or at least 100 MHz or at least 200 MHz or at least 300 MHz or at least 400 MHz or at least 500 MHz or at least 600 MHz or at least 700 MHz or at least 800 MHz or at least 900 MHz, e.g., about 1 GHz or more.

Figure 3:
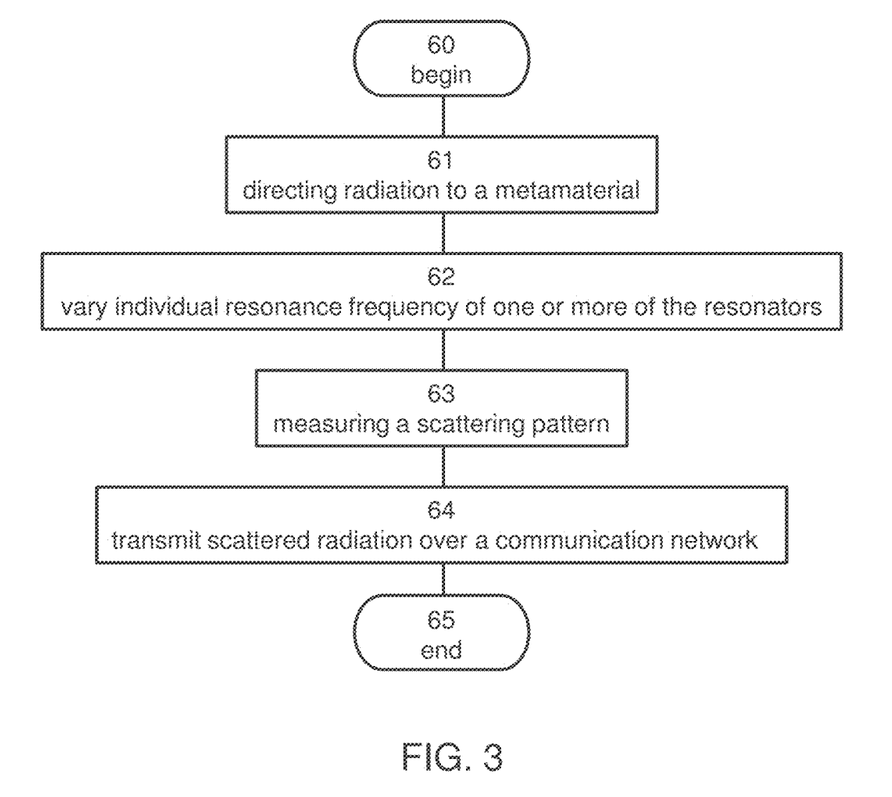
FIG. 3 is a flowchart diagram of a method suitable for controlling radiation scattering, according to various exemplary embodiments of the present invention.

FIG. 3 is a flowchart diagram of a method suitable for controlling radiation scattering, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 60 and continues to 61 radiation is directed to a metamaterial, such as, but not limited to, metamaterial 10. The radiation can be of any type and frequency described above. The method optionally and preferably continues to 62 at which an individual resonance frequency of one or more of the resonators of the metamaterial is varied to provide a collective resonance scattering of the radiation by the metamaterial. Operation 62 can be executed by applying voltage or other trigger to the respective circuits in the metamaterial. In some embodiments of the present invention the voltage is applied by directing additional radiation to the metamaterial, and in some embodiments of the present invention the voltage is applied using a power source connected to the circuits.

The method optionally and preferably continues to 63 at which a scattering signal in one or several directions of the collective resonance scattering is measured. This embodiment is particularly useful when the metamaterial is incorporated in an identification tag, in which case the measured scattering pattern can be used for identifying the tag. In some embodiments of the present invention there is a plurality of spaced apart metamaterials, and the method is executed simultaneously with respect to more than one metamaterial. Specifically, the radiation is directed to more than one metamaterial, the resonance frequency is varied simultaneously for more than one metamaterial, and the scattering patterns are measured simultaneously for more than one metamaterial.

The method can additionally or alternatively proceed to 64 at which the scattered radiation is transmitted over a communication network. This embodiment is particularly useful when the metamaterial is incorporated in a communication system as further detailed hereinabove.

Preferably, but not necessarily, operation 62 is executed dynamically to provide frequency hopping. The voltage to the circuits can be applied individually and selectively to one or more of the circuits, or collectively to one or more groups of circuits, or to all the circuits in the metamaterial. The dynamic variation is advantageous particularly, but not exclusively, for simultaneous identification of more than one metamaterial. This can be done in more than one way. In some embodiments of the present invention each metamaterial is characterized by a different, predetermined and distinguishable collective resonance spectrum. In some embodiments of the present invention each metamaterial is characterized by a different, predetermined and distinguishable response time, allowing the reader to identify which metamaterial is responding at which time instant. In some embodiments of the present invention the circuits of each metamaterial delays its response by a delay time, wherein the delay time is stochastically selected from a predetermined delay time range that is substantially longer (e.g., at least 10 times longer) than the duration of the response itself, and operation 64 is executed over a time window that is longer than the predetermined delay time range, thereby increasing the probability for time-separated responses of different metamaterials. Other techniques for preventing overlapping between the responses are also contemplated.

The radiation directed at 61 can be generated by a radiation source, such as, but not limited to, a tag reader (e.g., reader 24), a radar system (e.g., system 34) or any other radiation source. The radiation source can be located at any distance from the metamaterial that allows the metamaterial to effect resonant scattering. It was found by the present inventors that the metamaterial of the present embodiments can provide detectable resonant scattering even if positioned at great distances from the radiation source. This property of the metamaterial is particularly useful when the metamaterial is incorporated in an identification tag, since it allows the identification tag reader to identify the tag from great distances, an ability that is not possessed in conventional identification tags. In some embodiments of the present invention, the distance between the radiation source and the metamaterial is at least 10 meters or at least 20 meters or at least 40 meters or at least 80 meters, e.g., about 100 meters or more.

Identification from large distance can be achieved by providing the metamaterial with a relatively large scattering cross section. The scattering cross section depends on the properties of the metamaterial and the geometrical shape of resonators. For example, resonant condition for a spherical metamaterial tag is permittivity equal to −2, for cylinder permittivity equal to −1. Other shapes have different resonant conditions, resulting from volumetric or surface properties of the construction.

The method ends at 65.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions illustrate some embodiments of the invention in a non limiting fashion.

Design Considerations

One of the contributing properties of structures that allows their identification from a distance, is their scattering cross section. The metamaterial of the present embodiments demonstrates scattering cross section which exceeds the values of its geometrical areas in the direction of the incident radiation. Various geometrical shapes exhibit strong dipolar and multipolar resonances for specific values of permittivity and permeability of the material components. For example, subwavelength sphere can resonate under conditions of either $\varepsilon$ or $\mu$ equals to $-2$ (or even both simultaneously).

In the metamaterial of the present embodiments the resonators are arranged in an array having periodicity that is smaller than the wavelength of the radiation to be scattered. For example, the array can be such that there are at least about 5 lattice constants per wavelength. The lattice constant can be, for example, the distance between two nearest neighbor resonators. The associated the wavelengths for frequencies in the range of from about 1 kHz to about 100 GHz, are from about 3 cm to about 300 km.

Figure 4A:
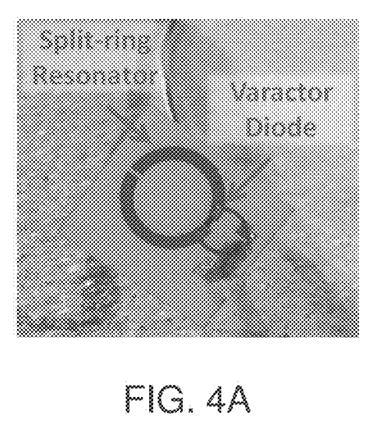
FIGS. 4A-E are images and illustrations of exemplified metamaterials fabricated and used in experiments performed in accordance with some embodiments of the present invention.
Figure 4B:
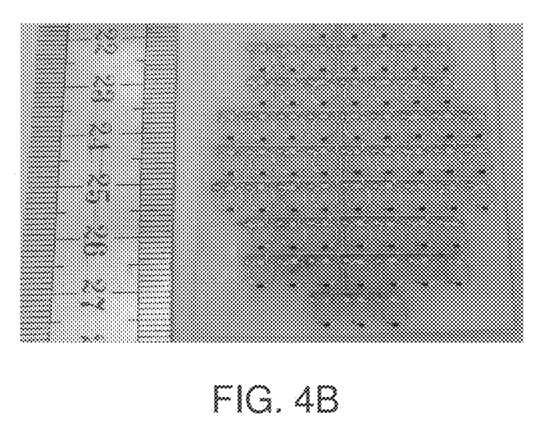
Figure 4C:
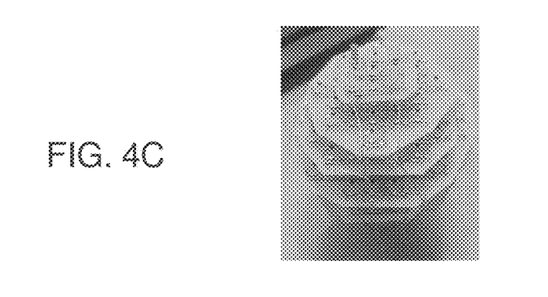

FIGS. 4A-C are images of exemplified metamaterials fabricated in accordance with some embodiments of the present invention. The resonators in this exemplified metamaterial are conducting split rings that can be considered as magnetic dipoles. Such a structure can mimic a magnetic material according to classical electrodynamics, and can therefore be described by effective permeability. FIG. 4A shows a single split-ring resonator (SRR), FIG. 4B shows a two-dimensional array of SRRs, and FIG. 4C shows a stack of two-dimensional SRR arrays forming a three-dimensional SRR array. In FIG. 4C, each split-ring has an auxiliary capacitor and varactor diode with a pair of electrical contacts.

Figure 4D:
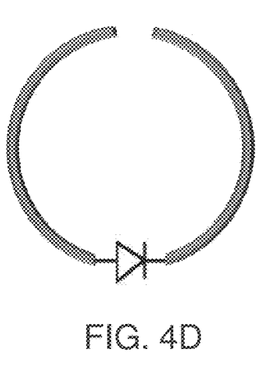
Figure 4E:
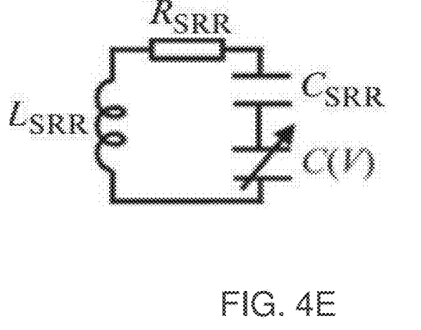
Figure 4F:
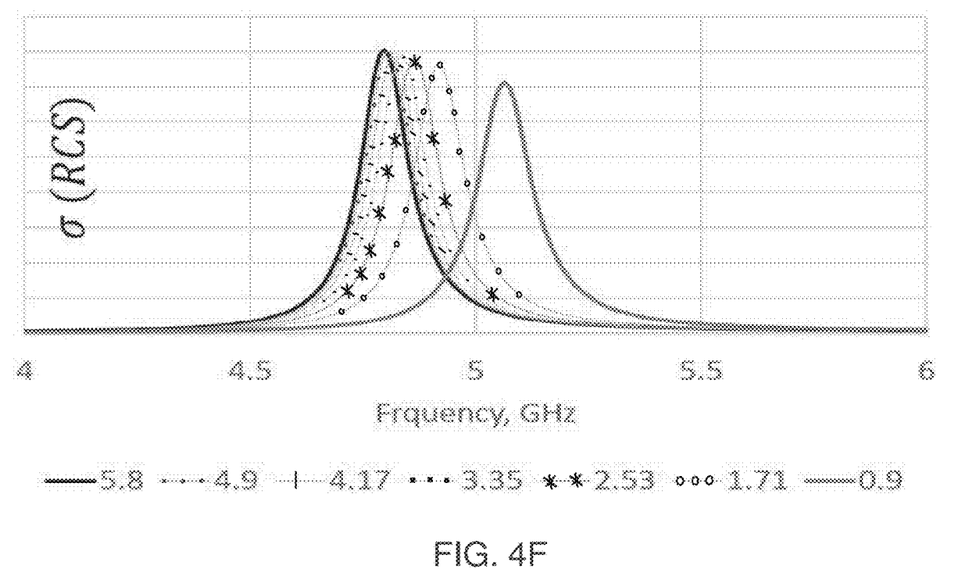
FIG. 4F is a graph demonstrating a tunability range of resonance of a resonator used in experiments performed in accordance with some embodiments of the present invention.

FIG. 4D is a schematic illustration of a single split-ring resonator (SSR) with a varactor diode, FIG. 4E is a schematic illustration of an equivalent electronic circuit, and FIG. 4F is a graph demonstrating the tunability range of the resonance of the resonator. The effective electromagnetic properties of each cell of the metamaterial can be controlled with dropping a voltage on the electronic circuit. In the present example, the electronic circuit is a varactor diode, which can be used as a voltage tunable capacitor. Thus, changing the reverse voltage on the varactor diode effect a change in the capacitance which in turn shifts the resonance of the resonator. The voltage on the diode can be supplied from an internal voltage source, obtained from the external radiation, for example, using a rectification circuit, obtained by harvesting thermal energy, or obtained by additional radiation, e.g., light, by means of a photodiode or solar cell. and other.

Figure 5A:
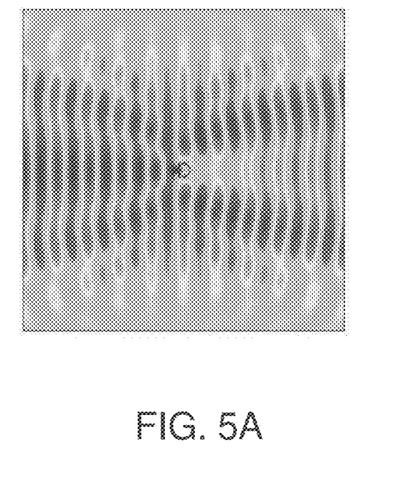
FIGS. 5A and 5B show scattering patterns obtainable by the metamaterial shown in FIGS. 4A-E.
Figure 5B:
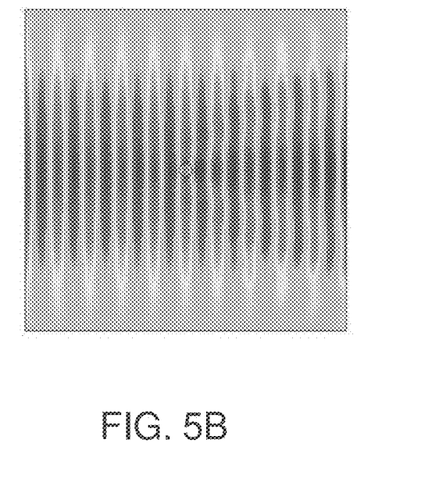

FIGS. 5A and 5B show scattering patterns obtainable by the metamaterial shown in FIGS. 4A-F. FIG. 5A shows resonant scattering corresponding to $\mu=-2$ and FIG. 5B shows non-resonant scattering corresponding to $\mu=+2$.

The collective properties of the metamaterial can vary with time by judicious selection of the voltage applied to the circuits of the metamaterial's cells. Such time variation can serve for isolating a tag to be identified from clutter, and/or for encoding additional information.

Figure 6:
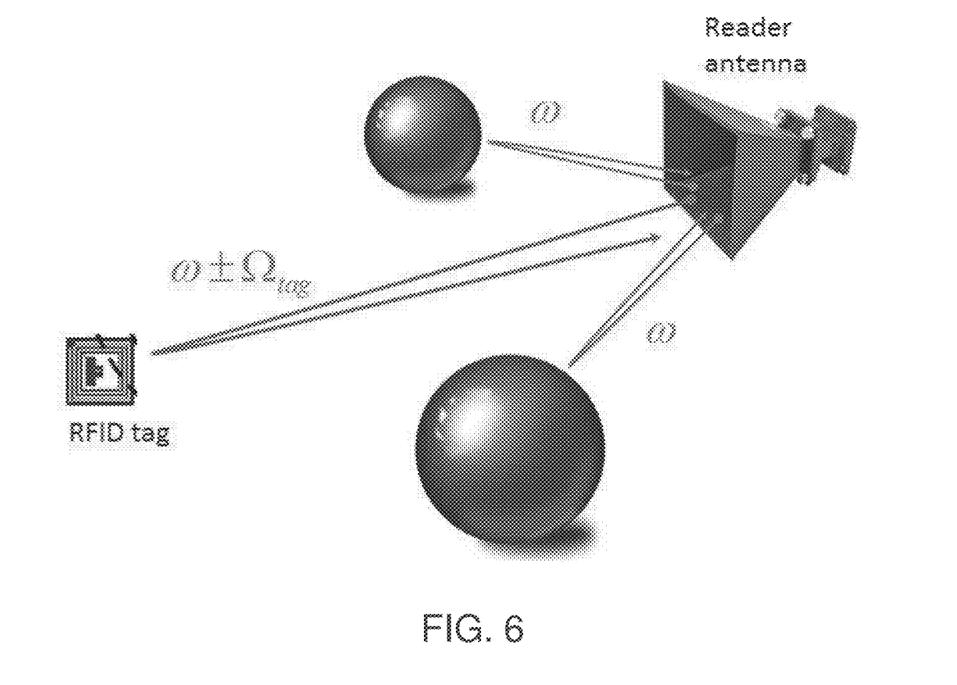
FIG. 6 is a schematic illustration describing lock-in detection, according to some embodiments of the present invention.

The concept of lock-in detection for separation of the tag's signature from the clutter is illustrated in FIG. 6. The radiation scattered from the tag is modulated in time. Thus, the radiation acquires a frequency shift, which can be easily detected, for example, by introducing a filter at the reader's path.

In experiments performed using the metamaterials shown in FIGS. 4A-F, the obtained scattering cross sections were several orders of magnitude higher than that of same shapes made of a solid metal. The metamaterials in this Example demonstrated detectability ranges of 200 m in clean environment, low gain antenna, radiating 2 W power was used.

Localized Magnon Resonances

Metamaterials can exhibit peculiar responses to electromagnetic radiation and provide additional powerful degrees of freedom to the scattering design. Negative material susceptibilities give rise to strong resonant interactions with deeply subwavelength particles. In this example the concept of artificial magnon resonance in subwavelength objects with effective negative permeability, designed with the metamaterial concept, is demonstrated. Strong localized oscillations of the magnetic fields within an array of split ring resonators, forming a sphere, hybridize in a collective mode of the structure. High scattering cross section, prevailing the value of a steel sphere with the same radius by four orders of magnitude, is demonstrated. Furthermore, the scattering cross section of 5 cm metamaterial-based sphere is shown to be comparable with the low frequency (MHz) radar signature of a big military aircraft Interactions of electromagnetic waves with structures give rise to many fundamental phenomena, occurring over the whole spectral range (e.g. optical and low GHz-MHz) and give rise to a vast of applications. Scattering cross sections of objects are defined by their geometries and material compositions. A span of optical materials is rather broad, which allows considering the material degree of freedom as a design parameter. For example, noble metals, such as silver and gold, have moderate negative permittivity at visible and infrared spectral ranges. This property allows observing and controlling resonant scattering phenomena from deeply subwavelength geometries and it is referred by the name localized plasmon resonance (LPR).

Metals demonstrate negative epsilon behavior and become primarily conductive at low-frequency ranges, virtually eliminating the ability to support LPR phenomenon. As the result, achieving resonant behavior of structures at MHz-GHz frequency ranges require utilizing retardation effects, which impose limitations on linear dimensions of scatterers. Reducing physical sizes of electromagnetic antennas, employed for supporting wireless communication links oftentimes requires additional compromising between many parameters, pre-defining performances. However, material property, in the majority of the cases, is not considered as a valuable degree of freedom, which can bring qualitatively new concepts into the field. For example, high epsilon ceramic composites enable shrinking effective wavelengths by orders of magnitude. Those materials require complex fabrication routines and are hardly sustain post processing due to their mechanical rigidity. One of the very promising concepts for tailoring material properties, which was found to be successful in application to MHz-THz frequency ranges, is to develop metamaterials having arrays and surfaces with subwavelength structuring. Properties of metamaterials can be homogenized and encapsulated within effective permittivity and permeability parameters.

Negative permittivity and permeability (in separate) composites are particularly discussed in this example. For example, plasmonic materials (ε<0) attempted for emulation using mesoscopic wire medium, while careful consideration of strong spatial dispersion should be taken into account. Artificial RF plasmonic materials were demonstrated in application to the invisibility cloaking. While realizations of strong collective electric responses require employment of dipolar-like resonators within an array, magnetic phenomena are governed by microscopic (on the subwavelength scale in the context of metamaterials) circular currents. Split ring resonators (SRRs) can be employed for achieving artificial magnetic responses.

If the collective response of near-field coupled SRRs (or other types of resonators) is strong enough, the homogenized effective permeability can become negative. As the result, small subwavelength structures can exhibit strong localized resonances, derived with the magnetic field, in a similarity with LPR. This effect is investigated in this example and can be employed for high radar scattering cross-section (RCS) applications.

Figure 7:
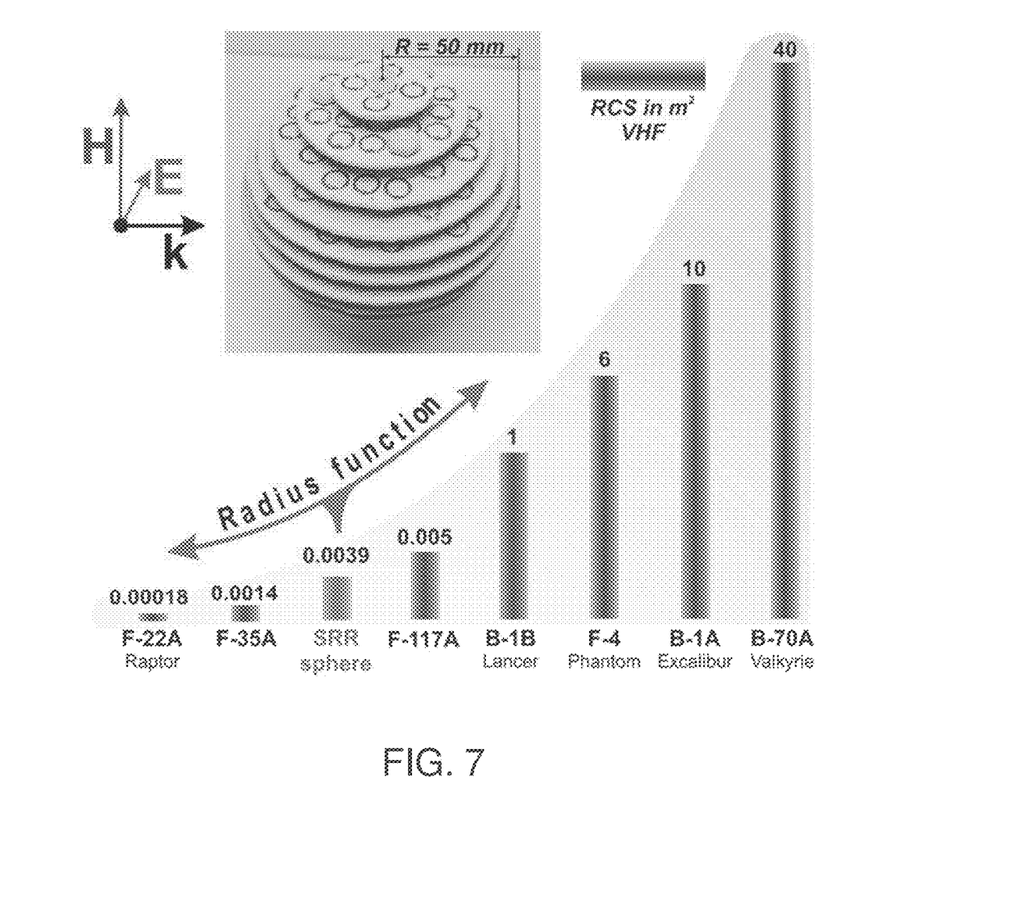
FIG. 7 is a bar chart demonstrating VHF radar cross-section (RCS) of several aircrafts.

FIG. 7 is a bar chart demonstrating VHF radar cross-section (RCS) of several aircrafts. Numbers on top of the bars correspond to the values of RCS in m². The third bar from the left corresponds to the meta-scatterer, which RCS can be further controlled by changing its radius. The inset is a photograph of the metamaterial-based spherical scatterer (5 cm radius), comprised of split ring resonators arrays, loaded with lumped capacitors.

Negative Permeability Composites and Artificial Localized Magnon Resonances

Localized plasmon resonance phenomenon utilizes collective oscillations of conduction electrons within noble metals and causes small deeply subwavelength particles to exhibit strong resonant responses. For example, 5 nm gold spheres resonate at 500 nm, demonstrating performances of efficient electromagnetically small resonators, which ads as small as λ/100 in size. Relying on the symmetry between electric and magnetic fields, ensured by Maxwell's equations, a similar phenomenon is expected to emerge in the case of negative permeability structures. In this case, the polarizability of a small magnetic sphere is given by:

$$\alpha_m = 4\pi r^3 \left( \frac{\mu_r - 1}{\mu_r + 2} \right), \quad (1)$$

where $\mu_r$ is the relative permeability of the material, and r is the radius of the sphere. This expression can be modified to include the retardation effects, if the skin depth (for magnetic field penetration) becomes comparable with the radius. With the full analogy to the electrical particles, the modified polarizability is given by:

$$\alpha_m = 4\pi \left( \frac{1}{r^3} \cdot \frac{\mu_r + 2}{\mu_r - 1} - i\frac{2}{3}k^3 - \frac{k^2}{r} \right)^{-1}, \quad (2)$$

where k is the free space wave vector of the incident radiation. Eq. 1 shows that the resonant conditions are obtained when $\mu_r = -2$ and the quality factor of the resonance is limited by the material losses. Following the terminology of the localized plasmon resonance in the case of $\varepsilon_r = -2$, the magnetic phenomenon is referred to herein as localized magnon resonances with the classification "artificial" in order to distinguish from the solid state effect of collective excitation of the electrons' spins in a crystal lattice.

The resonant condition of Eq. 1 depends on the geometry and can be tuned by its adjustment. Spherical geometry is selected in this example for the sake of the analytical simplicity of the analysis, but other geometries are also contemplated.

Unlike negative permittivity materials, negative permeability materials are almost abandoned in nature. Nevertheless, they can be created artificially by constructing arrays of ring resonators, which mimic a crystal of microscopic magnetic spins. Additional split with or without a lumped capacitor element can be added in order to tune the resonance of the structure to a desired frequency.

Figure 8A:
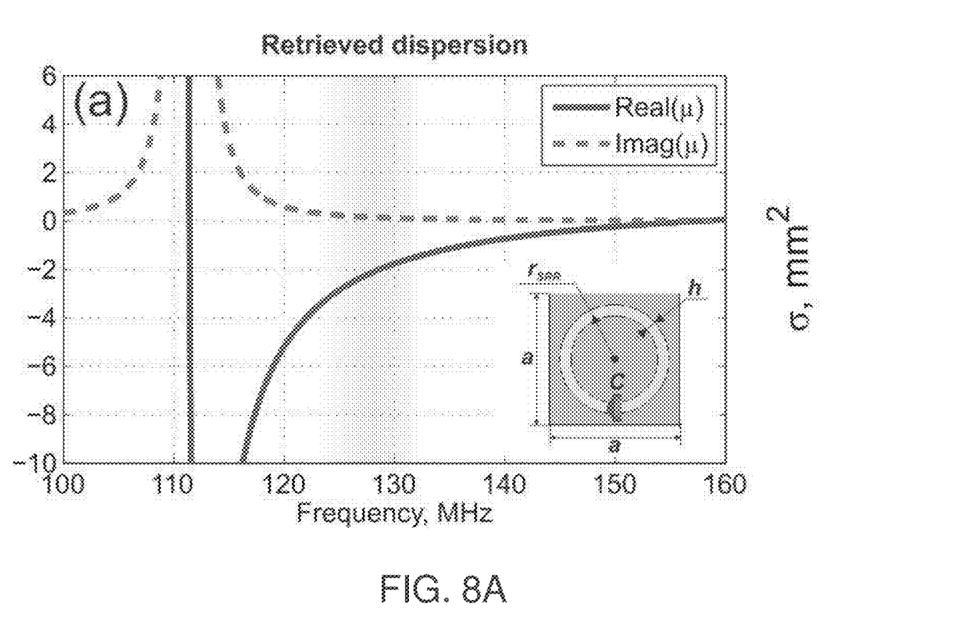
FIG. 8A shows dispersion of homogenised array of split ring resonators (in the inset), obtained in experiments performed according to some embodiments of the present invention.
Figure 8B:
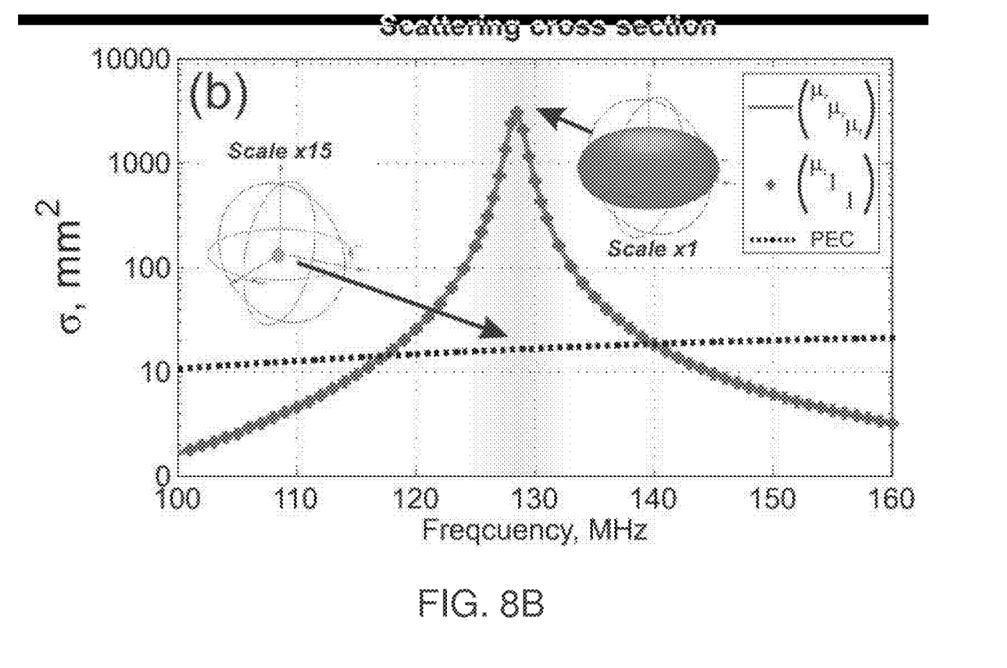
FIG. 8B shows scattering cross section spectra of a 5 cm radius sphere made of a homogeneous material, obtained in experiments performed according to some embodiments of the present invention.

FIG. 8A shows dispersion of the homogenised array of split ring resonators (in the inset). The solid line is real part of the relative permeability, the dashed line is its imaginary part. FIG. 8B shows scattering cross section spectra of a 5 cm radius sphere made of a homogeneous material: isotropic (solid line), anisotropic (crosses), and made of perfect electric conductor (dots). The latter is multiplied by 15 for a better visibility on the log scale. The insets show log-scale scattering patterns of the structures.

The layout and parameters of the split ring resonator appears in the inset to FIG. 8A. Identical SRRs were placed at the nodes of a 3D array (at the nodes of a simple cubic crystal with the period a) and effective electric and magnetic susceptibilities were retrieved. While an ideal array of rings can be homogenized analytically by applying coupled dipoles summations a full wave numerical simulation with CST microwave studio was performed (frequency domain solver with 1E-9 accuracy). It allows taking into account effects of asymmetry, impact of substrates and losses, and higher order electric and magnetic couplings, which are ignored in the beforehand mentioned analytical approach. Typical two-port waveguide system, with relevant dimensions to the specific frequency range was used. Complex-valued transmission and reflection coefficients (so called S-parameters) were calculated for three different orientations, corresponding to the main crystallographic axis of the metamaterial, and the permittivity and permeability tensors were extracted, following the formulation, reported at [X. Chen, T. M. Grzegorczyk, B.-I. Wu, J. Pacheco, and J. A. Kong, "Robust method to retrieve the constitutive effective parameters of metamaterials," Phys. Rev. E, vol. 70, no. 1, p. 16608, July 2004]. The following parameters of the structure were obtained after a set of optimizations: $r_{SRR}$=2.5 mm, h=0.5 mm, a=6 mm, C=220 pF. The substrate was taken to be Isola of 1 mm thickness. The resulting dispersion of effective magnetic medium appears in FIG. 8A. Both real and imaginary parts resemble the classical Lorentzian shape close to the collective resonance. The region of interest, where the effective permeability approaches values of −2 is highlighted with a dark shadow. The corresponding frequency was chosen to fall within the region of VHF radar operation for a demonstration of the concept only. The homogenised arrays of planar rings have anisotropic permeability tensor. FIG. 8A demonstrates its component along the normal to the rings, while other two are virtually equal to unity. As the result, the composite behaves as a hyperbolic metamaterial for the magnetic field.

Scattering cross-section spectrum of the 5 cm sphere, made of the artificial magnetic material appears in FIG. 8B. Two scenarios for the material permeability were considered here: isotropic $\mu_r$ and hyperbolic tensor, discussed beforehand. In deep subwavelength geometries, where the scattered field is known to be uniform inside the sphere, both of the cases demonstrate the same behavior (polarization of the incident magnetic field is assumed to be along the direction of the nontrivial tensor component). The comparison between the meta-scatterer and a solid sphere, made of perfect electric conductor appears in FIG. 8B. Four orders of magnitude in the RCS enhancement owing to the artificial localized magnon resonance can be observed (note that the dotted line is multiplied by the factor of 15 in order to be seen on the logarithmic scale). This tremendous enhancement results in the effect schematically depicted in FIG. 7, where 5 cm sphere scatters as much as a big aircraft. Both of the objects are subwavelength in the case of VHF radar applications.

Experimental Demonstration of Artificial Localized Magnon Resonances and Super Scattering at GHz Spectral Range In order to demonstrate the beforehand discussed phenomena, experimental studies are performed at the GHz spectral range, but other ranges are also contemplated. The same retrieval procedure was employed in order to extract and optimize effective parameters of split ring resonators arrays. The same geometric parameters, as in the beforehand MHz case, were used apart from the lumped capacitor, which was taken to be C=1 pF.

Figure 9A:
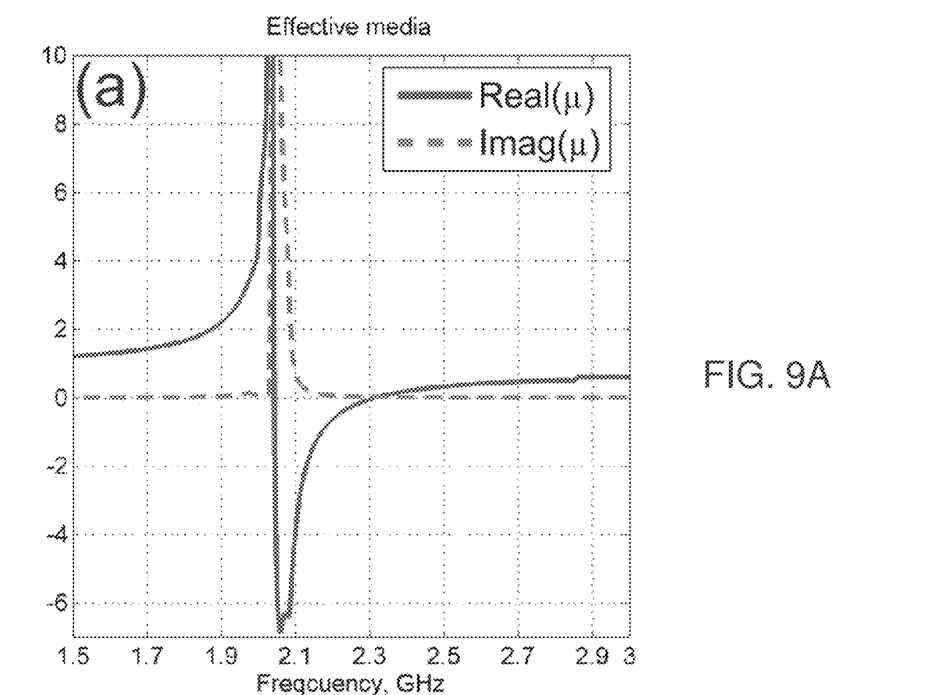
FIG. 9A shows a retrieved relative permittivity spectrum, obtained in experiments performed according to some embodiments of the present invention.
Figure 9B:
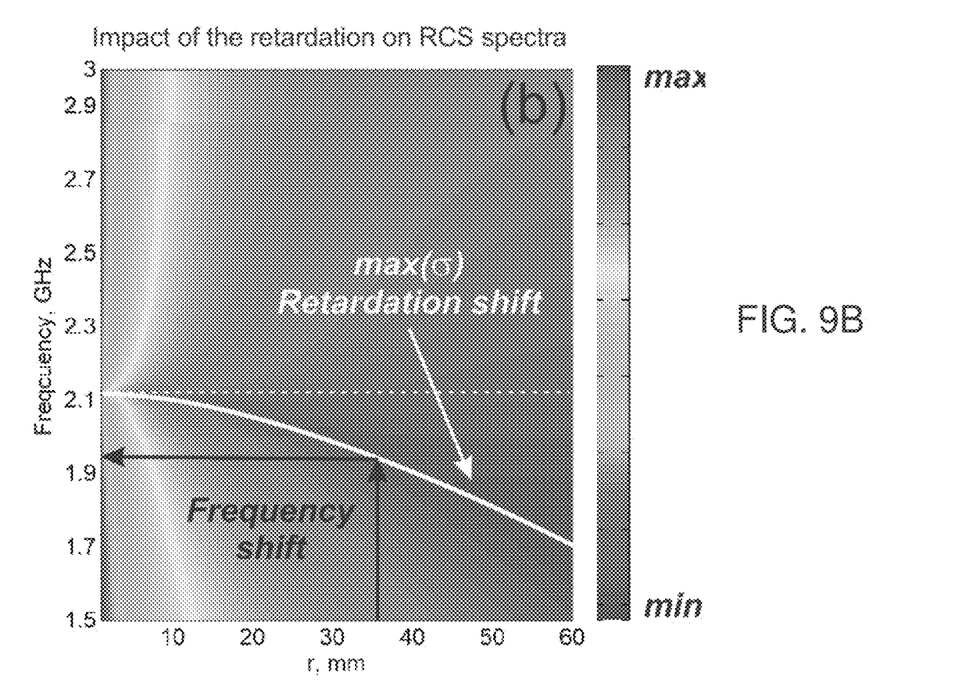
FIG. 9B is a colour map of RCS spectra as the function of a sphere radius, obtained in experiments performed according to some embodiments of the present invention.

FIG. 9A shows a retrieved relative permittivity spectrum. The dashed line is the imaginary part of $\mu_{eff}$, and the solid line is the real part of $\mu_{eff}$. FIG. 9B is a colour map of the RCS spectra (along with the vertical axis) as the function of the sphere radius (horizontal axis). The sphere was made of a material with homogeneous permittivity with the dispersion, which appears in FIG. 9A. The bright dashed line represents the position of the RCS peak without considering the retardation effect, and the bright solid line follows the RCS peak, underlining the influence of the retardation shift.

Deep subwavelength structuring at the GHz spectral range preferably includes miniaturizing of the resonators and soldering of lumped elements, which also start influencing the scattering owing to their packaging sizes. The subwavelength structure can start experiencing retardation effects. The color map in FIG. 9B shows the evolution of the RCS spectrum as the function of the sphere size. The spectra were obtained numerically, while the particle effective tensor was taken to be anisotropic (hyperbolic dispersion). The white line, showing the RCS peak, was calculated using Eq. 2. While this analytical formula was derived for the purely isotropic case, it fits extremely the numerical data and shows the redshift of the peak with the radius increase. This effect has been observed experimentally as is demonstrated below.

Experimental sample, following the effective medium design, was fabricated with the same parameters. The metasphere contains 13 layers, separated by 6 mm distance. SRRs arrays were fabricated on low loss Isola substrate by a standard lithography, followed by chemical etching. Lumped elements with a declared small dispersion (0.5%) in the nominal capacitance were soldered (542 elements in overall). The photograph of the sample is shown in FIG. 7. The RCS of the sample was measured.

Figures 10A, 10B, 10C:
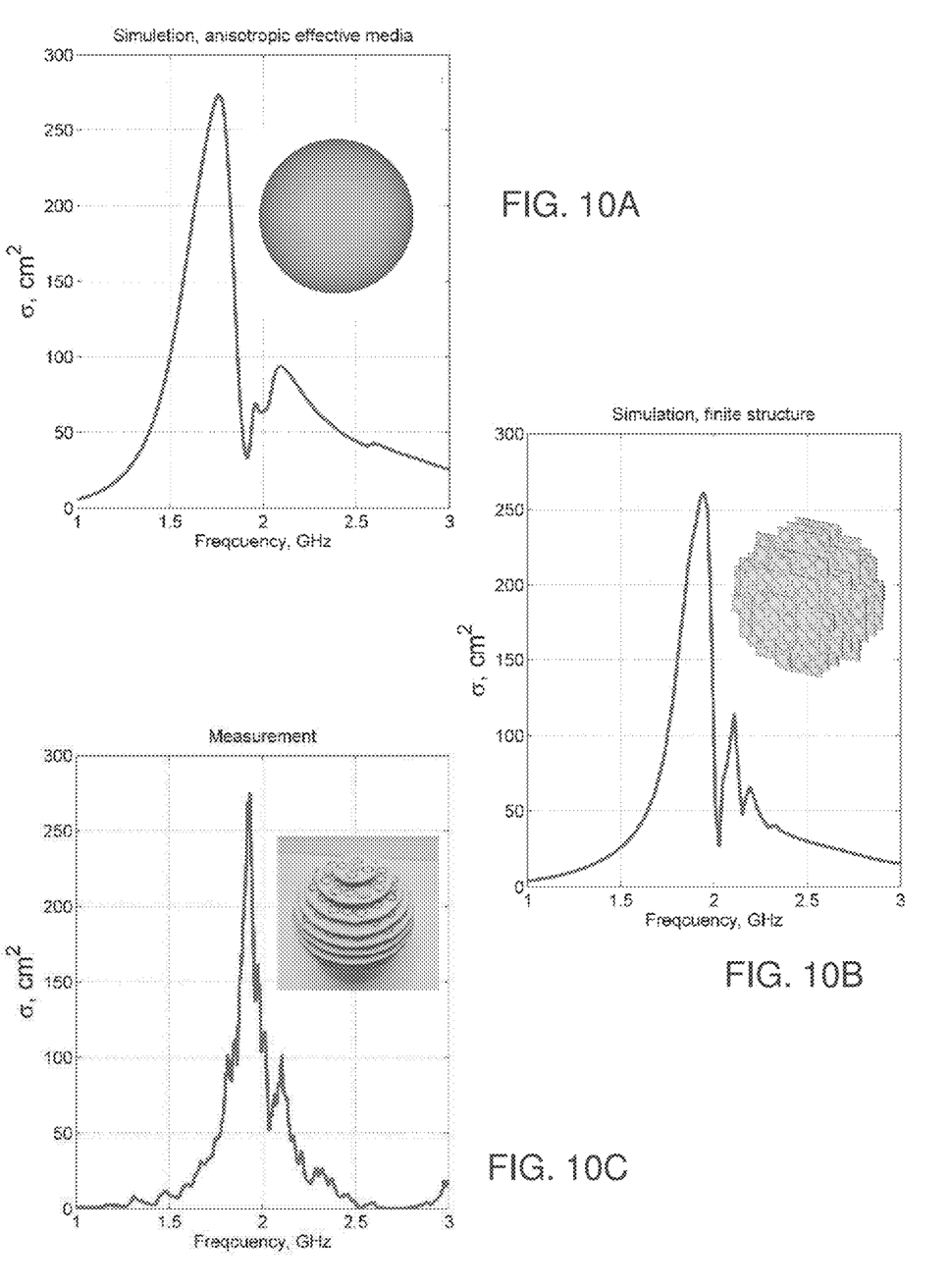
FIGS. 10A-C show scattering cross section spectra obtained in experiments performed according to some embodiments of the present invention using a metamaterial-based sphere.

FIGS. 10A-C show scattering cross section spectra of metamaterial-based sphere with 5 cm radius. FIG. 10A shows numerical modeling of the RCS spectrum of the homogenized sphere with anisotropic magnetic tensor, FIG. 10B shows full wave numerical modeling of the metamaterial scatterer, made of split ring resonator arrays (13 planes, 542 SRRs in overall), and FIG. 10C shows experimental data for the sample, which follows the design shown in FIG. 10B. An excellent agreement between all three methods is demonstrated. The main peak on the RCS spectrum corresponds to the dipolar resonance, which is calculated with Eq. 2 (the shift originates from the retardation effect). The secondary peak, blue-shifted with respect to the main shift, corresponds to the quadrupole mode. Its resonant condition is $\mu_r=-1.5$ in a fully quasistatic approximation. Its spectral location agrees with the dispersion curve of the effective medium (FIG. 9A). The maximum RCS value is about 250 cm$^2$, which is about one order of magnitude larger than the geometric area of the scatterer ($\pi r^2$). This ratio can be further increased, by replacing the SRRs with higher quality factor resonators, improving the substrate losses and improving the nominal dispersion of lumped elements.

This Example demonstrated the effect of artificial localized magnon resonance in arrays of near field coupled split rings. Negative effective permeability was shown to be responsible to the strong scattering cross section of the metamaterial-based sphere. As a representative and non-limiting example, a 5 cm radius scatterer was studied and was shown to have a VHF radar signature, which is comparable with a big military aircraft. Experiments were made at the GHz frequency band and demonstrated good agreement with theoretical predictions and full wave numerical simulations. Scattering cross sections of the designed objects, operating at the localized magnon resonance, were found to prevail the signatures of steel spheres by orders of magnitude.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] M. Born and E. Wolf, Principles of Optics: Electromagnetic Theory of Propagation, Interference and Diffraction of Light, 7th ed. Cambridge University Press, 1999.

[2] C. E. Balanis, Antenna Theory: Analysis and Design, 3rd Edition—Constantine A. Balanis. A JOHN WILEY & SONS, INC, Pages: 1136, 2005.

[3] L. Novotny and B. Hecht, Principles of Nano-Optics, 2nd ed. Cambridge University Press, 2012.

[4] N. Berkovitch, P. Ginzburg, and M. Orenstein, "Nanoplasmonic antennas in the near infrared regime," Journal of Physics: Condensed Matter, vol. 24, no. 7. p. 73202, 2012.

[5] P. N. Kumta, "Processing of Interconnected Glass and Ceramic Composites for Electronic Packaging." 1996.

[6] N. Engheta and R. W. Ziolkowski, Electromagnetic Metamaterials: Physics and Engineering Explorations. Wiley-IEEE Press; 1 edition, 2006.

[7] C. R. Simovski, "On electromagnetic characterization and homogenization of nanostructured metamaterials," J. Opt., vol. 13, no. 1, p. 13001, January 2011.

[8] S. B. Glybovski, S. A. Tretyakov, P. A. Belov, Y. S. Kivshar, and C. R. Simovski, "Metasurfaces: From microwaves to visible," Phys. Rep., vol. 634, pp. 1-72, May 2016.

[9] P. A. Belov, A. P. Slobozhanyuk, D. S. Filonov, I. V. Yagupov, P. V. Kapitanova, C. R. Simovski, M. Lapine, and Y. S. Kivshar, "Broadband isotropic μ near-zero metamaterials," Appl. Phys. Lett., vol. 103, no. 21, 2013.

[10] M. Lapine, A. K. Krylova, P. A. Belov, C. G. Poulton, R. C. McPhedran, and Y. S. Kivshar, "Broadband diamagnetism in anisotropic metamaterials," Phys. Rev. B, vol. 87, no. 2, p. 24408, January 2013.

[11] D. Schurig, J. J. Mock, B. J. Justice, S. A. Cummer, J. B. Pendry, A. F. Starr, and D. R. Smith, "Metamaterial electromagnetic cloak at microwave frequencies.," Science, vol. 314, no. 5801, pp. 977-80, November 2006.

[12] D. S. Filonov, A. S. Shalin, I. Iorsh, P. A. Belov, and P. Ginzburg, "Controlling electromagnetic scattering with wire metamaterial resonators," J. Opt. Soc. Am. A, vol. 33, no. 10, p. 1910, October 2016.

[13] R. A. Shelby, D. R. Smith, and S. Schultz, "Experimental verification of a negative index of refraction.," Science, vol. 292, no. 5514, pp. 77-9, April 2001.

[14] F. Mesa, M. Freire, R. Marques, and J. Baena, "Three-dimensional superresolution in metamaterial slab lenses: Experiment and theory," Phys. Rev. B, vol. 72, no. 23, p. 235117, December 2005.

[15] H. Caglayan, I. Bulu, M. Loncar, and E. Ozbay, "Experimental observation of cavity formation in composite metamaterials," Opt. Express, vol. 16, no. 15, p. 11132, July 2008.

[16] M. Caiazzo, S. Maci, and N. Engheta, "A metamaterial surface for compact cavity resonators," IEEE Antennas Wirel. Propag. Lett., vol. 3, no. 1, pp. 261-264, December 2004.

[17] J. Pendry, A. Holden, W. Stewart, and I. Youngs, "Extremely Low Frequency Plasmons in Metallic Mesostructures," Phys. Rev. Lett., vol. 76, no. 25, pp. 4773-4776, June 1996.

[18] P. A. Belov, R. Marques, S. I. Maslovski, I. S. Nefedov, M. Silveirinha, C. R. Simovski, and S. A. Tretyakov, "Strong spatial dispersion in wire media in the very large wavelength limit," Phys. Rev. B, vol. 67, no. 11, p. 113103, March 2003.

[19] B. Edwards, A. Alù, M. G. Silveirinha, and N. Engheta, "Experimental Verification of Plasmonic Cloaking at Microwave Frequencies with Metamaterials," Phys. Rev. Lett., vol. 103, no. 15, p. 153901, October 2009.

[20] J. B. Pendry, A. J. Holden, D. J. Robbins, and W. J. Stewart, "Magnetism from conductors and enhanced nonlinear phenomena," IEEE Trans. Microw. Theory Tech., vol. 47, no. 11, pp. 2075-2084, 1999.

[21] F. Capolino, Applications of metamaterials. CRC Press, 2009.

[22] M. Gorkunov, M. Lapine, E. Shamonina, and K. H. Ringhofer, "Effective magnetic properties of a composite material with circular conductive elements," Eur. Phys. J. B, vol. 28, no. 3, pp. 263-269, August 2002.

[23] B. T. Draine, "The discrete-dipole approximation and its application to interstellar graphite grains," Astrophys. J., vol. 333, p. 848, October 1988.

[24] M. Meier and A. Wokaun, "Enhanced fields on large metal particles: dynamic depolarization," Opt. Lett., vol. 8, no. 11, p. 581, November 1983.

[25] F. Bloch, "Zur Theorie des Ferromagnetismus," Zeitschrift für Phys., vol. 61, no. 3-4, pp. 206-219, March 1930.

[26] X. Chen, T. M. Grzegorczyk, B.-I. Wu, J. Pacheco, and J. A. Kong, "Robust method to retrieve the constitutive effective parameters of metamaterials," Phys. Rev. E, vol. 70, no. 1, p. 16608, July 2004.

[27] N. Levanon and E. Mozeson, Radar signals. Wiley-IEEE Press; 1 edition, 2004.

[28] H. N. S. Krishnamoorthy, Z. Jacob, E. Narimanov, I. Kretzschmar, and V. M. Menon, "Topological transitions in metamaterials.," Science, vol. 336, no. 6078, pp. 205-9, April 2012.

What is claimed is:

1. A method of controlling radiation scattering, comprising: directing radiation to a metamaterial having an array of individually tunable and near field coupled resonators, varying an individual resonance frequency of at least one of said resonators to provide a collective resonance scattering of said radiation by said metamaterial, measuring a scattering signal of said collective resonance scattering of said radiation, and identifying said metamaterial based on said scattering signal.

2. The method according to claim 1, wherein there is a plurality of spaced apart metamaterials, and the method comprises simultaneously measuring signals scattered off at least two of said metamaterials.

3. The method according to claim 1, wherein said directing said radiation is by a radiation source at a distance of at least 10 meters from said metamaterial.

4. The method according to claim 1, wherein said metamaterial is a metasurface.

5. The method according to claim 1, wherein said metamaterial is configured such that a collective resonance frequency is variable over a range of at least 100 MHz by varying said individual resonance frequency of at least one of said resonators.

6. The method according to claim 1, wherein said varying is executed dynamically to provide frequency hopping.

7. The method according to claim 1, wherein said varying is by individually applying voltage to said at least one of said resonators.

8. The method according to claim 1, wherein said varying is by individually applying mechanical stress to said at least one of said resonators.

9. The method according to claim 1, wherein said varying is by applying heat to said at least one of said resonators.

10. The method according to claim 1, wherein said varying is by varying a humidity in an environment containing said at least one of said resonators.

11. The method according to claim 1, wherein said varying comprises directing additional radiation to said metamaterial.

12. The method according to claim 1, wherein said varying comprises varying a capacitance of said at least one resonator.

13. The method according to claim 1, wherein said varying comprises varying an inductance of said at least one resonator.

14. The method according to claim 1, wherein each resonator comprises a varactor diode and wherein said varying comprises applying a reverse voltage to said varactor diode.

15. The method according to claim 1, wherein each resonator comprises a transistor, and wherein said varying comprises applying a gate voltage to said transistor.

16. The method according to claim 1, wherein each resonator is characterized by a nonlinear response.

17. The method according to claim 1, further comprising modulating said radiation by at least one on of said resonators to encode information therein.

18. The method according to claim 1, wherein said collective resonance is a permeability resonance.

19. The method according to claim 1, wherein said collective resonance is a permittivity resonance.

20. The method according to claim 1, wherein said collective resonance is a permittivity resonance and a permeability resonance.

* * * * *